United States Patent [19]

Bannister et al.

[11] Patent Number: 4,949,177
[45] Date of Patent: Aug. 14, 1990

[54] METHOD AND APPARATUS FOR CARRYING OUT A NON-LINEAR OPERATION ON A DIGITAL SIGNAL

[75] Inventors: Richard S. Bannister, Grass Valley; Richard A. Jackson, Nevada City, both of Calif.

[73] Assignee: The Grass Valley Group, Inc., Grass Valley, Calif.

[21] Appl. No.: 245,603

[22] Filed: Sep. 19, 1988

[51] Int. Cl.$^5$ .............................................. H04N 5/275
[52] U.S. Cl. ...................................... 358/138; 358/183; 358/12; 340/728; 364/724.1
[58] Field of Search .................... 358/183, 22, 13, 133, 358/134, 137, 138, 12; 375/27, 37, 68, 70; 364/424.1; 340/728

[56] References Cited

U.S. PATENT DOCUMENTS

| | | |
|---|---|---|
| 3,997,772 | 12/1976 | Crochiere ........................ 364/724.1 |
| 4,468,708 | 8/1984 | Coleman ............................. 358/138 |
| 4,472,785 | 9/1984 | Kasuga ............................ 364/724.1 |
| 4,520,386 | 5/1985 | Asaida ................................. 358/13 |
| 4,531,151 | 7/1985 | Hentschke ........................... 358/13 |
| 4,771,192 | 9/1988 | Jackson ............................. 358/183 |

Primary Examiner—Tommy P. Chin
Attorney, Agent, or Firm—John Smith-Hill; Francis I. Gray

[57] ABSTRACT

A digital input signal having a sampling frequency f is interpolated by a factor N, where N is a positive integer, whereby a first digital signal having a sampling frequency Nf is generated. A non-linear operation is carried out on the first digital signal having the sampling frequency Nf and a second digital signal having the sampling frequency Nf is provided. The second digital signal is decimated by the factor N and thereby provides a digital output signal having the sampling frequency f.

9 Claims, 8 Drawing Sheets

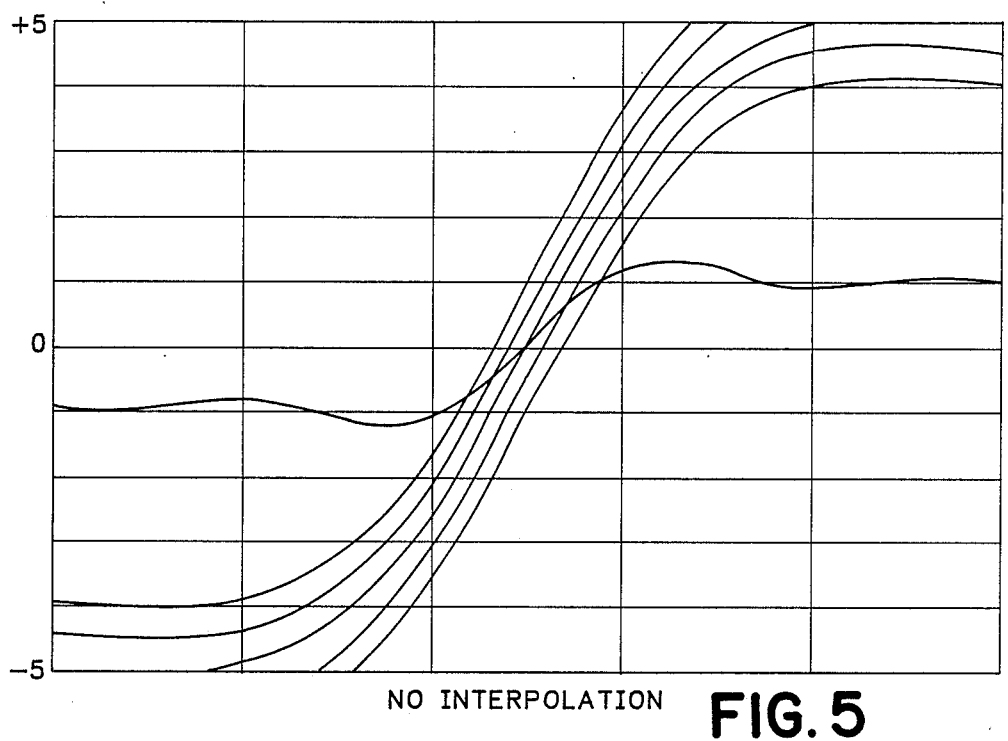
NO INTERPOLATION  FIG. 5
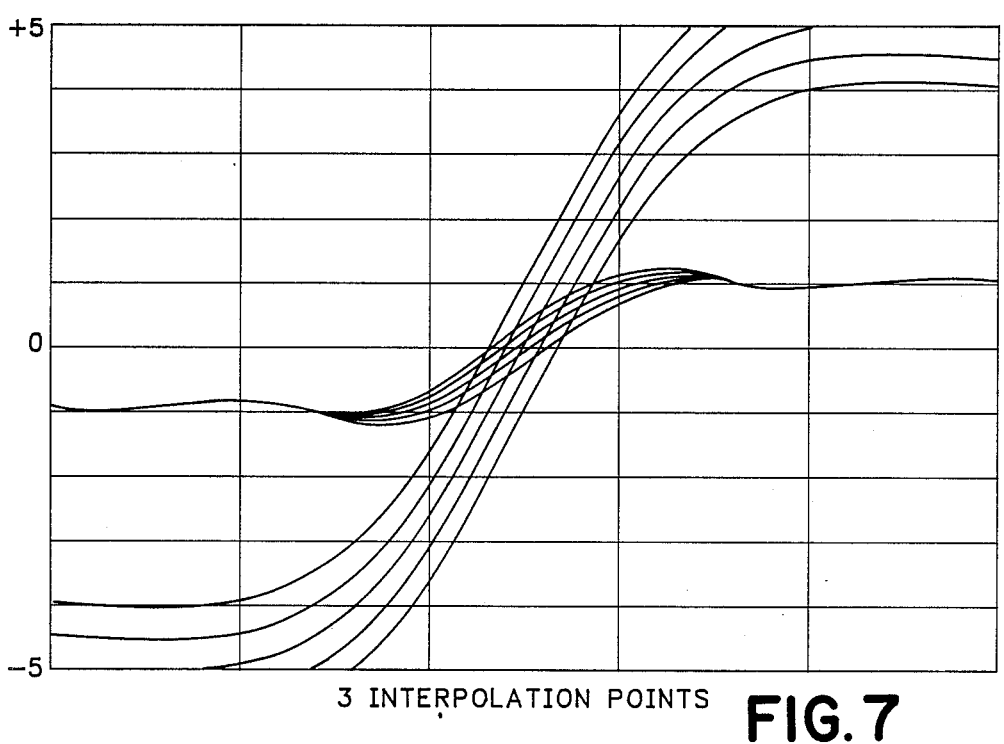
3 INTERPOLATION POINTS  FIG. 7

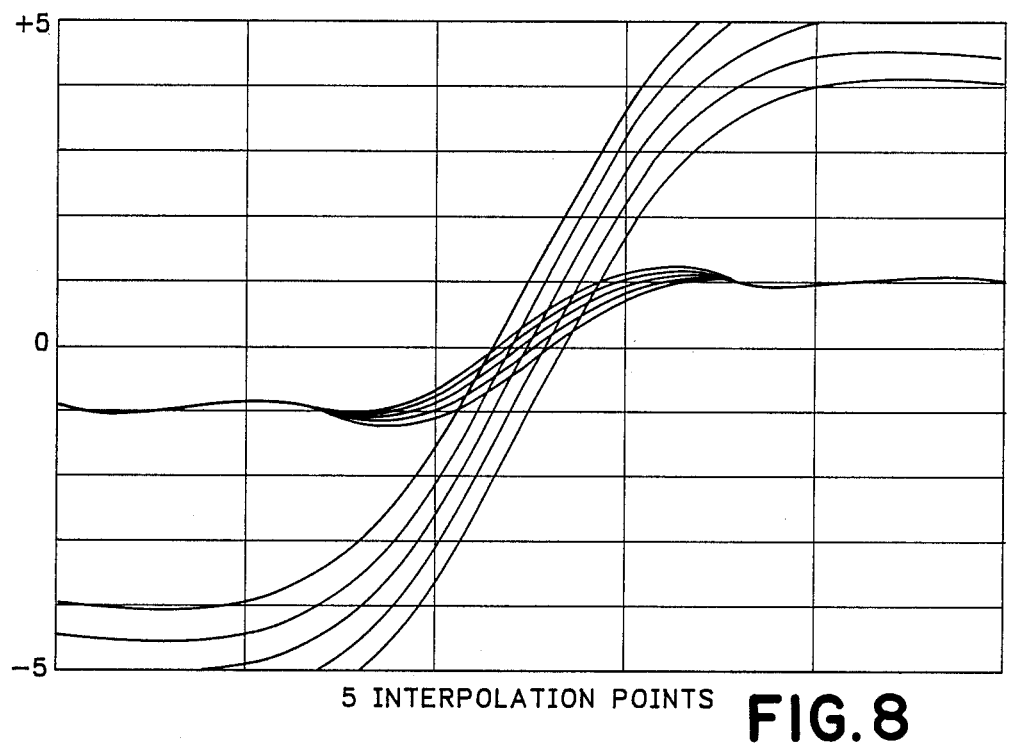
5 INTERPOLATION POINTS FIG. 8
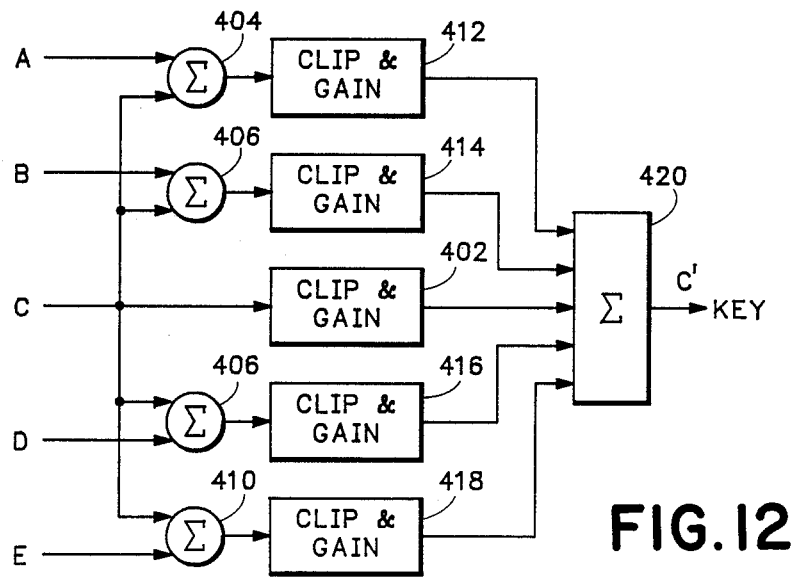
FIG. 12
```
LINE n-1   X  X  A  X  X
LINE n     X  B  C  D  X
LINE n+1   X  X  E  X  X
```

NO FILTERING OR INTERPOLATION.

X INTERCEPT IS : +4.839
Y INTERCEPT IS : +8.824
Z INTERCEPT IS : −15.000

5 POINT FILTER.

X INTERCEPT IS : +4.839
Y INTERCEPT IS : +8.824
Z INTERCEPT IS : −15.000

5 POINT INTERPOLATOR.

X INTERCEPT IS : +4.839
Y INTERCEPT IS : +8.824
Z INTERCEPT IS : −15.000

NO FILTERING OR INTERPOLATION.

X INTERCEPT IS : +4.600
Y INTERCEPT IS : +30.000
Z INTERCEPT IS : −10.000

5 POINT FILTER.

X INTERCEPT IS : +4.600
Y INTERCEPT IS : +30.000
Z INTERCEPT IS : −10.000

5 POINT INTERPOLATOR.

X INTERCEPT IS : +4.600
Y INTERCEPT IS : +30.000
Z INTERCEPT IS : −10.000

METHOD AND APPARATUS FOR CARRYING OUT A NON-LINEAR OPERATION ON A DIGITAL SIGNAL

Background of the Invention

This invention relates to a method and apparatus for carrying out a non-linear operation on a digital signal.

A video switcher may be used to combine input video signals from video sources to provide an output signal representing a picture composed partly of the image represented by one input video signal and partly of the image represented by the other input video signal The combination of the two input video signals may be accomplished by use of a mixer that selectively outputs one or the other of the video signals or a proportion of both in response to a control signal, commonly called a key signal. The control signal may be generated by performing a non-linear operation on a third video signal or on a wipe waveform or on one of the two input video signals. In the following description the term wipe is used to mean any one of these means of generating a control signal. In a wipe, the switcher receives input video signals representing two images and provides an output signal that changes from one input video signal to the other in response to a wipe signal, which defines a predetermined wipe pattern. FIG. 1 illustrates a simple split screen wipe, where the left side of the output picture is the left side of one input image and the right side of the output picture is the right side of the other input image. In this case, a wipe signal having a ramp waveform, which is a low voltage in areas corresponding to the left side of the picture and a high voltage in areas corresponding to the right side of the picture, as shown by the waveform A in FIG. 2, is generated. This wipe signal becomes the input to a clip and gain circuit (FIG. 3). The clip and gain circuit has a comparator 2, in which a clip level is subtracted from the voltage of the wipe signal, and the resulting difference signal (waveform B) is amplified by a multiplier 4 to provide an output signal (waveform C) which is limited at 8 to provide a key signal (waveform D). The key signal is applied to the control input of a mixer 10 that receives the input video signals at its two video input terminals. The key signal is indicated in FIG. 2 as having a range from −1 to +1, in arbitrary units. The output video signal may be described by

*Video out*=½ *Video* 1 (1+*key*)+½ *Video* 2 (1−*key*)

When the key signal value is 0, the video out luminance is composed of 50% of the luminance of video 1 plus 50% of the luminance of video 2, and therefore the locus of points for which the key signal value is 0 represents the boundary between the two images.

The clip level is under operator control and sweeps through a range of values as a manually operated control, such as a lever arm, is swept through a range of positions. In this way, the boundary between the two images represented by the input video signals may be moved horizontally, e.g. from left to right of the field By use of appropriate wipe signals, a boundary that is horizontal or inclined may be provided, and the boundary may be moved vertically or along an inclined path by adjusting the clip level.

A clip and gain operation may be implemented in the digital domain or the analog domain. In either case, problems can arise because the mixing operation is a multiplication process. Both the input video signals and the wipe signal have a potential bandwidth of 5 MHz, so that when these signals are multiplied together the resulting signal can have frequency components up to 10 MHz. In the analog domain, the out of band energy causes ringing in the band-limiting filters. In the digital domain, there is energy above the Nyquist frequency, which results in in-band alias frequencies.

In the digital domain, a second problem arises because the limiting that takes place in the clip and gain circuit is a non-linear process that can produce an infinite spectrum from an in-band signal. The components that are above the Nyquist frequency again produce in-band alias frequencies, which result in jaggies on key edges.

The waveforms E and F in FIG. 4 represent a digital wipe signal that is applied to a clip and gain circuit on successive lines of a video signal. The sample points are represented by circles, and the broken lines represent the analog waveform that results when the digital signal is passed through an appropriate reconstruction filter. The clip and gain circuit has a linear region, which is represented by the shaded band in FIG. 4. All wipe signal values that lie above the linear region are mapped to a key signal value of +1, all wipe signal values that lie below the linear region are mapped to a key signal value of −1, and wipe signal values that lie in the linear region are mapped linearly to key signal values between −1 and +1. The wipe signal represents a sloping boundary between the two images that form the output picture, in that the points at which the waveform of the wipe signal crosses the time axis on the two lines are spaced apart along the time axis.

FIG. 5 shows a reconstruction of a digital wipe signal on five consecutive lines of a video field. The sample values of the digital wipe signal represent a sine-squared edge having a range of +/−5 units. The sample times are represented by the vertical lines The digital key signal is limited to a range of +/−1 unit. The five sine-squared edges, occurring at different times, each result in a key edge that occurs at the same time. Ideally, five key edges, which intersect the five wipe edges respectively on the time axis, should be provided.

As shown in FIGS. 4 and 5, it is possible for all wipe signal sample values on two or more consecutive lines to be outside the linear region of the clip and gain circuit. If this occurs, the waveform of the key signal that is produced in response to the wipe signal is the same on the multiple lines. Accordingly, the desired sloping boundary between the two images is rendered as a succession of vertical segments joined by horizontal or near horizontal segments. The resulting jaggies may be visually disturbing.

SUMMARY OF THE INVENTION

A preferred embodiment of the present invention in a first aspect is a method of carrying out a non-linear operation on a digital input signal having a sampling frequency f. The method comprises interpolating the digital input signal by a factor N, where N is a positive integer, whereby a first digital signal having a sampling frequency Nf is generated, and carrying out a non-linear operation on the first digital signal having the sampling frequency Nf to provide a second digital signal having the sampling frequency Nf. The second digital signal is decimated by the factor N and thereby provides a digital output signal having the sampling frequency f.

A preferred embodiment of the present invention in a second aspect is apparatus for carrying out a non-linear operation on a digital input signal having a sampling frequency f. The apparatus comprises means for interpolating the digital input signal by a factor N, where N is a positive integer, whereby a first digital signal having a sampling frequency Nf is generated, and non-linear means connected to receive the first digital signal having the sampling frequency Nf and carry out a non-linear operation thereon and provide a second digital signal having the sampling frequency Nf. The apparatus also comprises means for decimating the second digital signal by the factor N and thereby providing a digital output signal having the sampling frequency f, which signal is the digital key signal.

BRIEF DESCRIPTION OF THE DRAWINGS

For a better understanding of the invention, and to show how the same may be carried into effect, reference will now be made, by way of example, to the accompanying drawings in which:

FIG. 5 illustrates the result of a computer simulation of a clip and gain operation on a digital wipe signal, FIG. 7 illustrates the result of a computer simulation of a clip and gain operation on a wipe signal that has been interpolated by a factor of three, FIG. 8 illustrates the result of a computer simulation of a clip and gain operation on a wipe signal that has been interpolated by a factor of five, FIG. 12 is a block diagram of apparatus for carrying out a method embodying the present invention.

DETAILED DESCRIPTION

Figure 1:
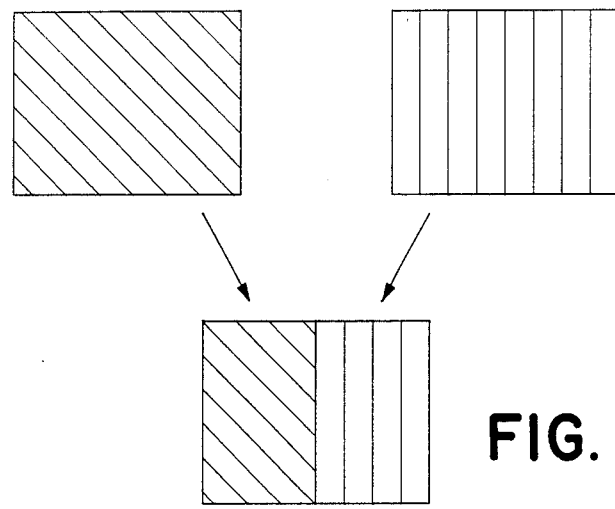
FIG. 1 illustrates schematically the visual effect of a split-screen wipe.
Figure 2:
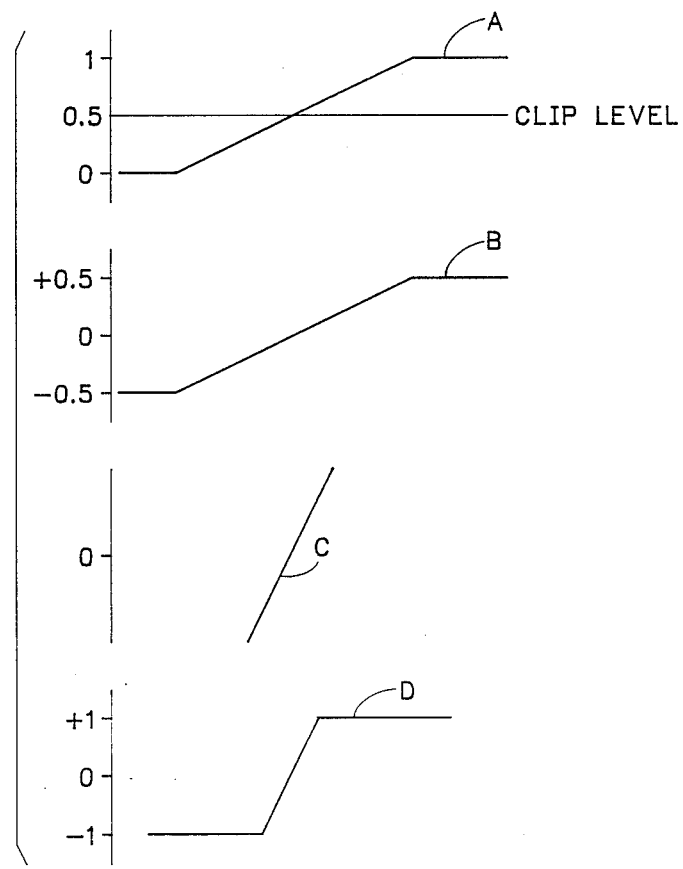
FIG. 2 illustrates waveforms useful in understanding how a wipe is performed.
Figure 3:
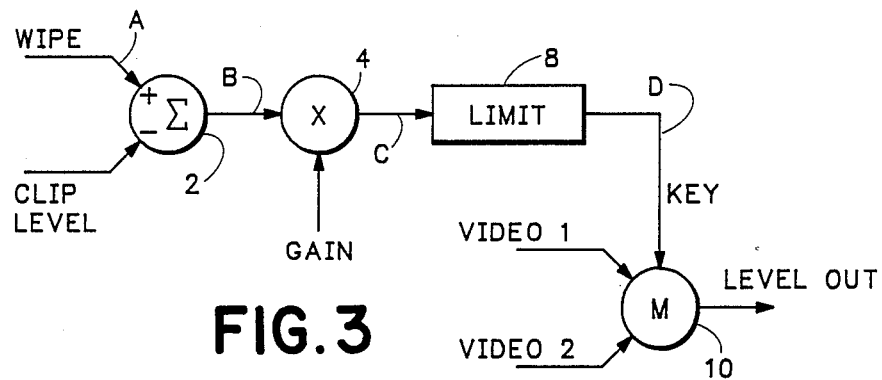
FIG. 3 is a block diagram of a clip and gain circuit.
Figure 6:
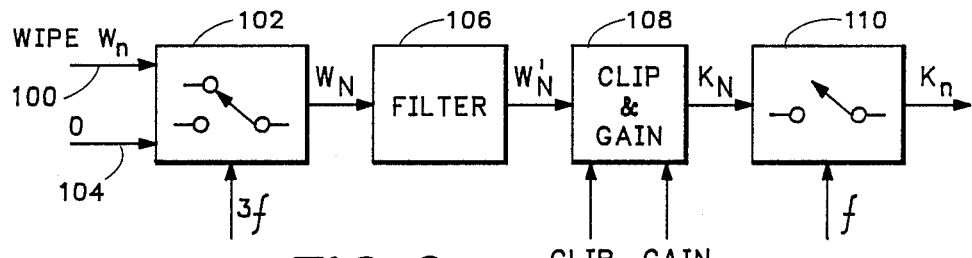
FIG. 6 is a block diagram of an apparatus for performing a clip and gain operation.
Figure 4:
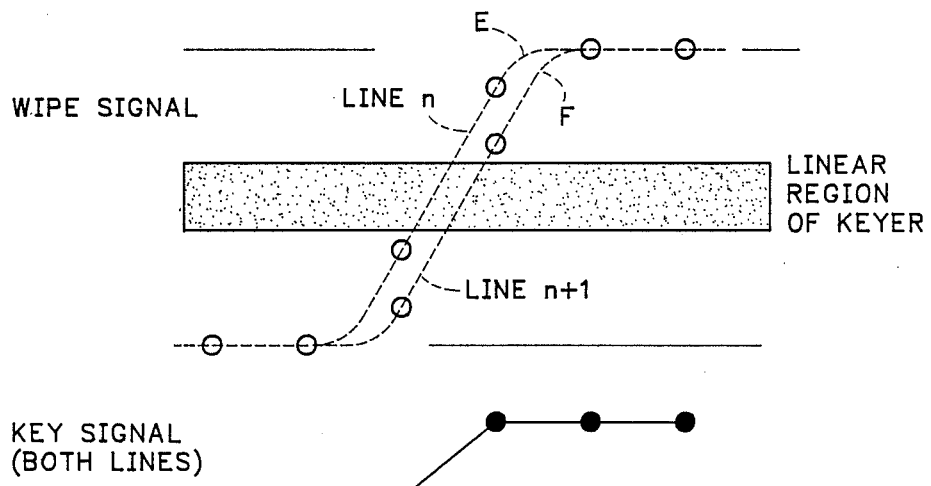
FIG. 4 illustrates waveforms of a digital wipe signal and a corresponding digital key signal.

The apparatus shown in FIG. 6 has an input terminal 100 at which it receives a digital wipe signal $W_n$ at a sampling frequency f of 13.5 MHz. The input terminal 100 is connected to a switch 102 which has a second input terminal 104 at which it receives a signal representing a wipe value of zero. The switch 102 receives a control signal at a frequency 3f, and selects the terminals 100 and 104 sequentially so as to produce an output signal $W_N$ at a sampling frequency 3f and of the form $W_i$, 0, 0, $W_{i+1}$, etc. The signal $W_N$ is applied to a filter 106 which provides an output signal $W'_N$ by linear interpolation. Interpolating in this fashion ensures that the signal $W'_N$ does not include any components above the Nyquist frequency. The signal $W'_N$ at the sampling frequency 3f, is applied to a simple clip and gain circuit 108, which may be of the form shown in FIG. 3, and provides a key signal $K_N$ at the sampling frequency 3f. The key signal $K_N$ is then decimated by a decimator 110, which operates under control of a signal at the frequency f and selects every third sample value of the signal $K_N$, resulting in a key signal $K_n$ at the sampling frequency f.

FIG. 7 illustrates the result of using the circuit shown in FIG. 6 with the wipe signal shown in FIG. 5. As shown in FIG. 7, instead of a single key edge, five distinct key edges are produced. Accordingly, use of the circuit shown in FIG. 6 results in less severe jaggies than use of a simple clip and gain circuit.

FIG. 8 illustrates the key edges that are obtained in response to the same five sine-squared wipe edges in the event that the linear interpolation is by a factor of five, instead of by a factor of three. As shown in FIG. 8, the key edges intersect the respective wipe edges on the time axis. Accordingly, no jaggies would be observed in this case.

Figure 9A:
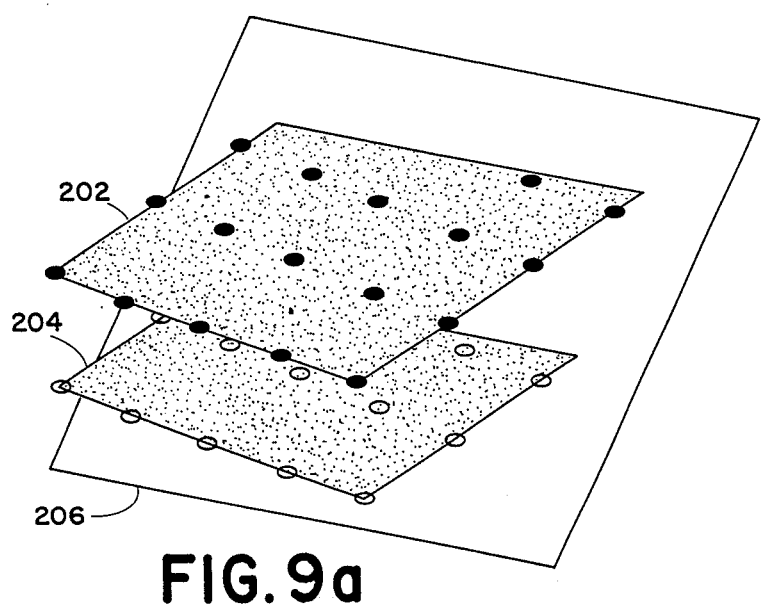
FIG. 9a and 9b are three-dimensional representations of the manner in which a key signal is generated from a wipe signal.
Figure 9B:
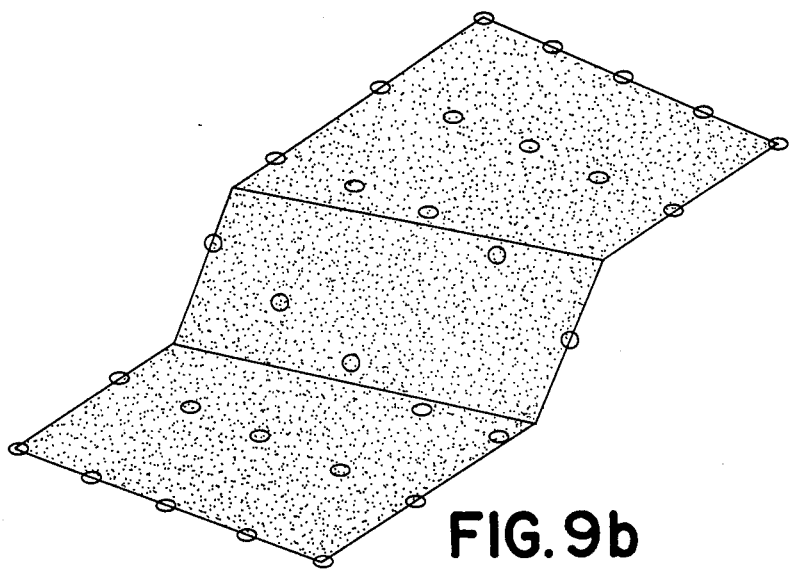

In FIG. 9(a), the planes 202 and 204 represent the positive and negative clip levels whereas the plane 206 represents the wipe edge. The three plane segments shown in FIG. 9(b) represent the key signal that results from applying the wipe edge represented by the plane 206 to a clip and gain circuit having positive and negative clip levels represented by the planes 202 and 204. As shown in FIG. 9(b), the range of the linear region of the clip and gain circuit is sufficient in relation to the slope of the wipe edge that sample points of the key signal lie within the linear region.

Figure 10:
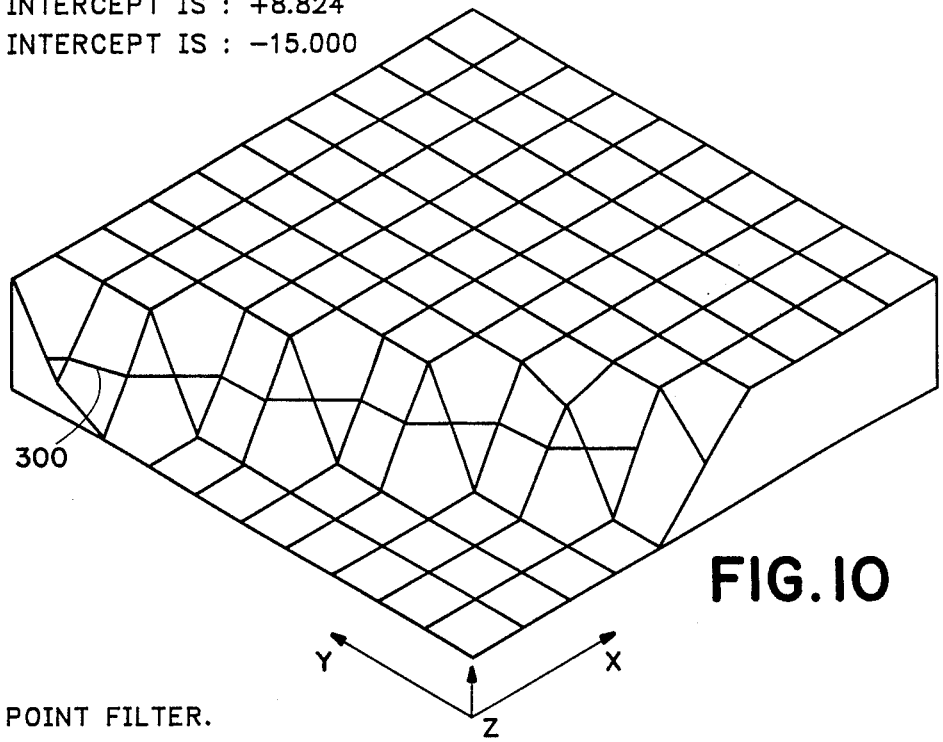
FIG. 10 is a three-dimensional plot of a key signal produced by a conventional clip and gain circuit, and in which the wipe signal defines a boundary that is at about 61° to the horizontal.

FIG. 10 is a three-dimensional plot illustrating the key signal provided by a conventional clip and gain circuit that receives a wipe signal representing a plane. In FIG. 10, the x-axis represents the horizontal, i.e. line scanning, direction of a video field, the y-axis the vertical direction and the z-axis the signal amplitude. The wipe plane intersects the x-y plane in a line that is inclined to the x and y axes. Each line in the x direction represents one scan line of the video signal. The line 300 is the locus of points on the key edge equidistant from the positive and negative clip levels, and thus represents the boundary between two images that are mixed under control of the key signal. The line 300 should be straight since it is formed by the intersection of the wipe plane and the plane that is midway between the two clip levels. However, the line 300 is composed of segments that are parallel to the y-axis and segments that are inclined to the x and y axes. Therefore, the picture that would be obtained by using the output of the clip and gain circuit to control a wipe from one input video signal to another input video signal would exhibit jaggies.

Figure 11:
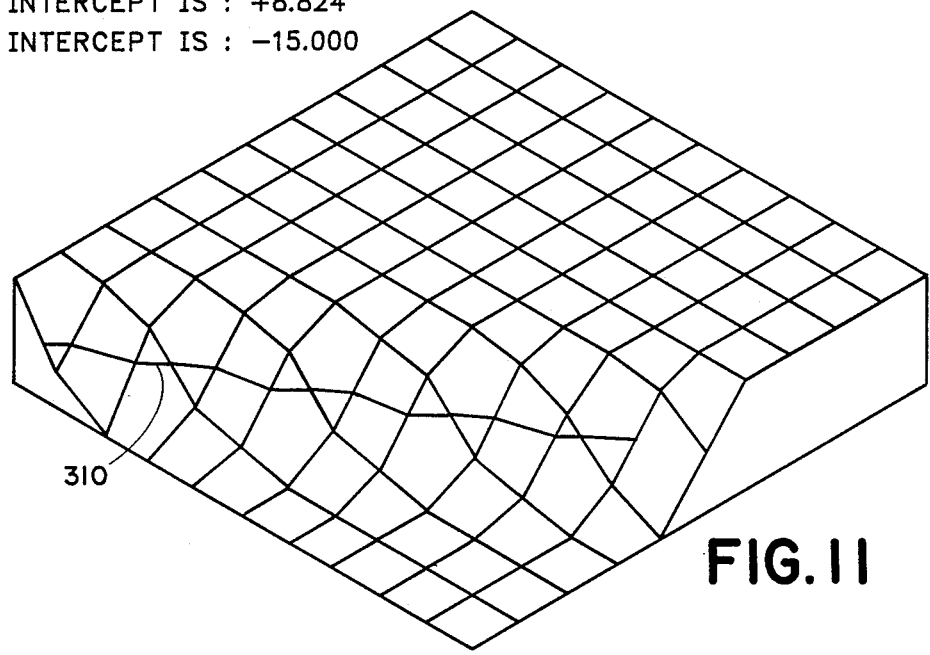
FIG. 11 is a three-dimensional plot of a key signal produced by spatially filtering the output of a clip and gain circuit.

The signal that is obtained by spatially filtering the key signal represented in FIG. 10 is represented by the three-dimensional plot shown in FIG. 11. The line 310, which corresponds to the line 300 of FIG. 10, is less jagged than the line 300, but this has been achieved at the expense of a substantial reduction in the rise time of the key edge.

FIG. 12 shows a clip and gain apparatus that carries out a two-dimensional interpolation over three adjacent lines of a wipe signal, then carries out a simple clip and gain operation and decimates the outputs of the clip and gain circuits to provide a key signal. Through use of an arrangement of single sample delays and line delays, sample values A–E are provided. The sample value C is applied directly to a clip and gain circuit 402 and is applied to summation circuits 404–410, which each have two inputs and receive the sample values A, B, D and E at their second inputs respectively. By summing the sample values A and C, B and C etc, interpolated sample values are generated. The outputs of the summation circuits are applied to further clip and gain circuits 412–418, and the outputs of the five clip and gain circuits are applied to a summation circuit 420 which provides a sample value C', which is an equally-weighted sum of the outputs of the clip and gain circuits.

Figure 13:
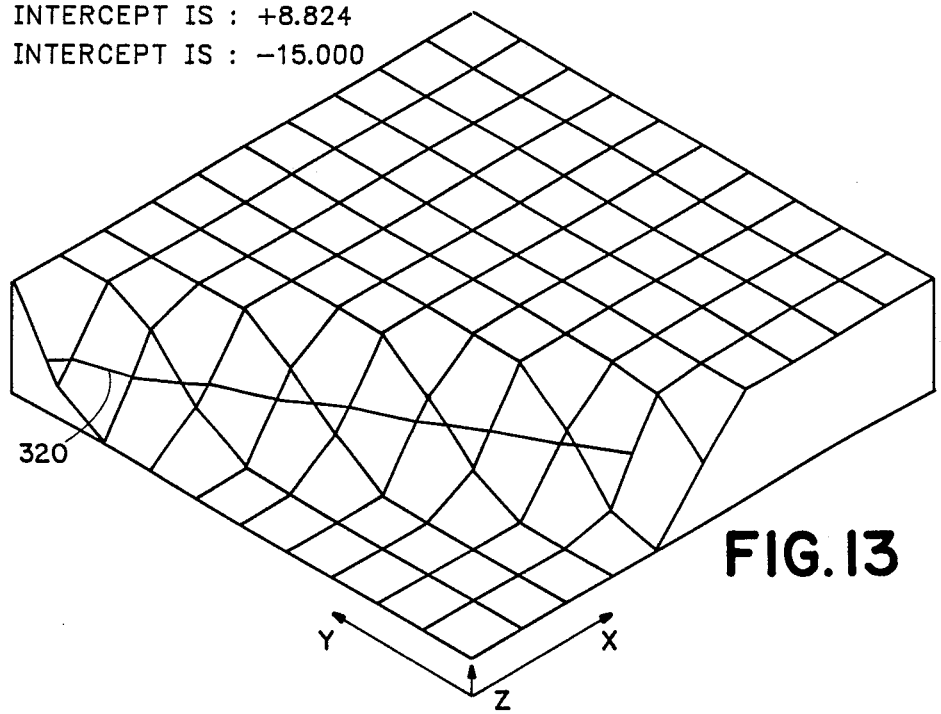
FIG. 13 is a three-dimensional plot of a key signal produced by the apparatus shown in FIG. 12, FIGS. 14, 15 and 16 are plots produced under circumstances similar to those in which FIGS. 10, 11 and 13 respectively were produced, but in which the wipe signal represents a boundary that is at about 81° to the horizontal.

FIG. 13 represents the key signal that is provided when the wipe signal that was used to generate the plots shown in FIGS. 10 and 11 is applied to the apparatus shown in FIG. 12. In FIG. 13, the 50% luminance line 320 is much less jagged than the line 300 or 310 of FIG. 10 or 11, and the rise time of the key edge has not been increased to an unacceptable degree.

Figure 14:
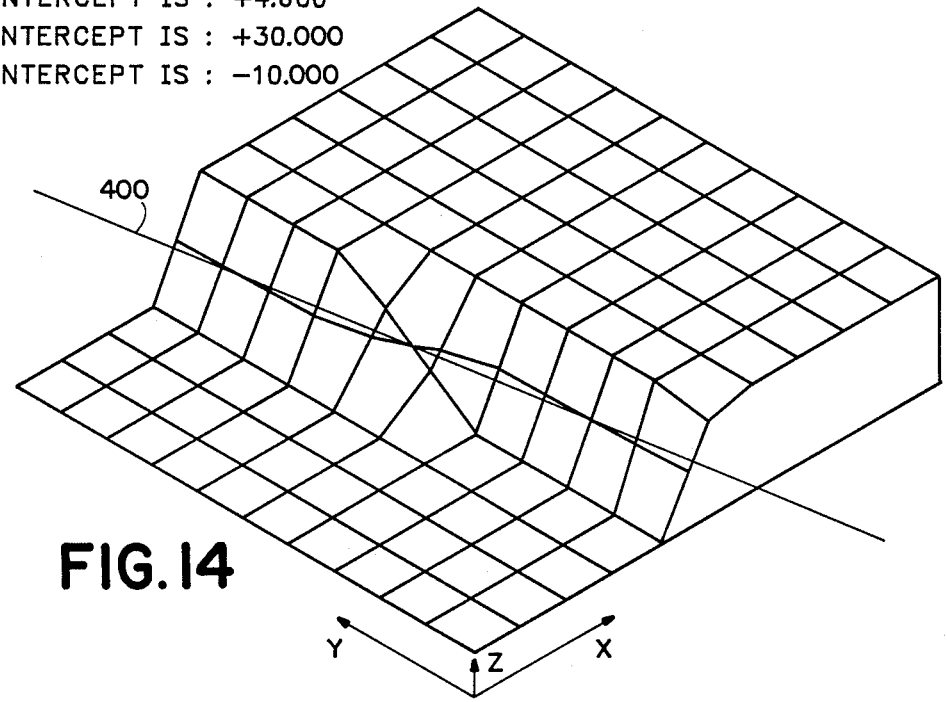
Figure 15:
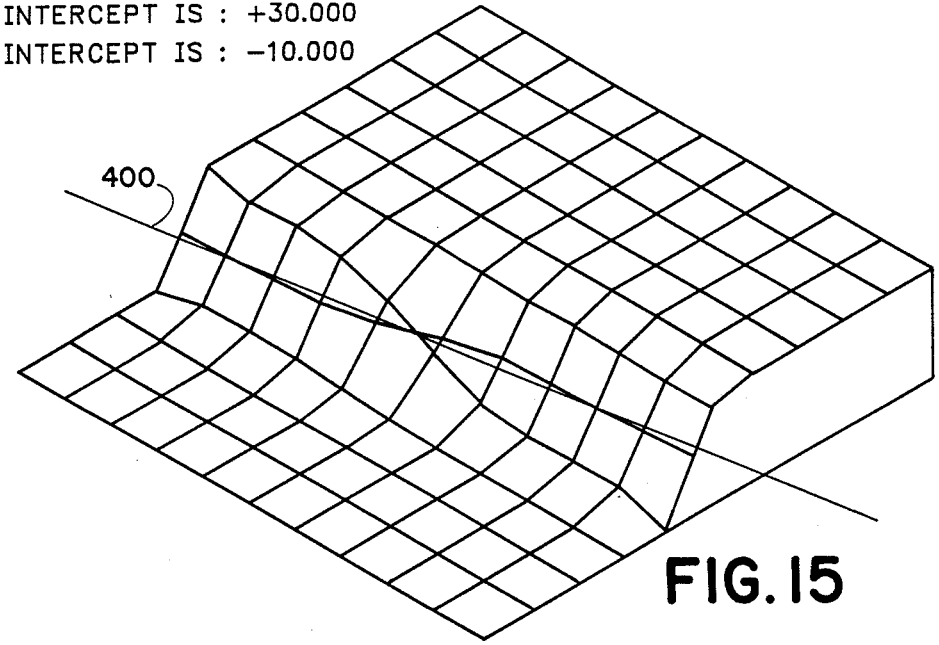
Figure 16:
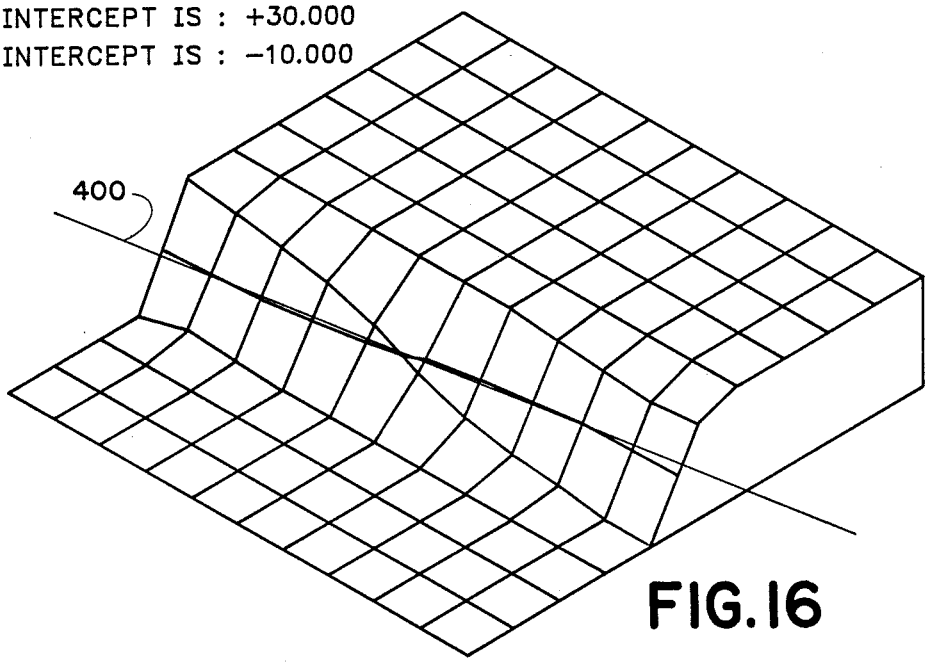

FIGS. 14, 15 and 16 are similar to FIGS. 10, 11 and 13 except that the key edge is more nearly vertical. FIGS. 14, 15 and 16 also show a line 400 indicating the theoretically correct position of the 50% luminance line. On the first five lines shown in FIG. 14, the transition starts at sample 4 and ends at sample 5, and in the last four lines the transition starts at sample 3 and ends at sample 4, and the jaggy is clearly evident at the sixth and seventh lines. In the case of FIG. 15, where the key signal is filtered after the clip and gain circuit, the jaggy is still plainly visible and the 50% luminance line does not match the theoretically correct line significantly better than in the case of FIG. 14. In the case of FIG. 16, the 50% luminance line lies almost exactly in the theoretically correct place and the jaggy is less pronounced than in FIG. 15.

It will be appreciated that the invention is not restricted to the particular embodiments that have been described, and that variations may be made therein without departing from the scope of the invention as defined in the appended claims and equivalents thereof. For example, although the operations of interpolation, decimation etc. have been described with reference to a hardware implementation of the invention, the invention may also be implemented in software.

We claim:

1. A method of carrying out a non-linear operation on a digital input signal having a sampling frequency f, comprising:
   interpolating the digital input signal by a factor N, where N is a positive integer, whereby a first digital signal having a sampling frequency Nf is generated,
   carrying out a non-linear operation on the first digital signal having the sampling frequency Nf and providing a second digital signal having the sampling frequency Nf, and
   decimating the second digital signal by the factor N and thereby providing a digital output signal having the sampling frequency f.

2. A method according to claim 1, wherein the non-linear operation includes a clipping operation.

3. A method according to claim 1, wherein the digital input signal is a wipe signal and the non-linear operation is a clip and gain operation.

4. A method according to claim 3, wherein the interpolating step comprises interpolating the wipe signal by the factor N in one dimension.

5. A method according to claim 3, wherein the interpolating step comprises interpolating the wipe signal by the factor N in two dimensions.

6. Apparatus for carrying out a non-linear operation on a digital input signal having a sampling frequency f, comprising:
   means for interpolating the digital input signal by a factor N, where N is a positive integer, whereby a first digital signal having a sampling frequency Nf is generated,
   non-linear means connected to receive the first digital signal having the sampling frequency Nf and to carry out a non-linear operation thereon to provide a second digital signal at the sampling frequency Nf, and
   means for decimating the second digital signal by the factor N to provide a digital output signal having the sampling frequency f.

7. Apparatus according to claim 6, wherein the non-linear means comprise clipping means for limiting the range of the first digital signal having the sampling frequency Nf.

8. Apparatus according to claim 6, wherein the non-linear means comprise a clip and gain circuit.

9. Apparatus according to claim 8, wherein the means for interpolating the digital input signal comprise means for interpolating by the factor N in two dimensions.

* * * * *